US010089149B2

(12) United States Patent
Lee et al.

(10) Patent No.: US 10,089,149 B2
(45) Date of Patent: Oct. 2, 2018

(54) METHOD FOR SCHEDULING MULTIPLE PERIODIC REQUESTS AND SCHEDULING DEVICE

(71) Applicant: INDUSTRIAL TECHNOLOGY RESEARCH INSTITUTE, Hsinchu (TW)

(72) Inventors: Kuen-Min Lee, Tainan (TW); Yi-Hung Lu, Kaohsiung (TW); Jung-Chih Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 231 days.

(21) Appl. No.: 14/981,149

(22) Filed: Dec. 28, 2015

(65) Prior Publication Data

US 2017/0153924 A1 Jun. 1, 2017

(30) Foreign Application Priority Data

Nov. 27, 2015 (TW) .............................. 104139733 A

(51) Int. Cl.
G06F 9/46 (2006.01)
G06F 9/50 (2006.01)
G06F 9/48 (2006.01)

(52) U.S. Cl.
CPC .......... *G06F 9/5038* (2013.01); *G06F 9/4887* (2013.01)

(58) Field of Classification Search
None
See application file for complete search history.

(56) References Cited

U.S. PATENT DOCUMENTS 6,986,068 B2 * 1/2006 Togawa ................. G06F 1/324
   713/300
7,039,012 B2 * 5/2006 Nakano ................. G06F 9/4881
   370/230

(Continued)

FOREIGN PATENT DOCUMENTS

CN    103491174 A    1/2014
CN    104699533 A    6/2015

(Continued)

OTHER PUBLICATIONS

Aydin et al., "Optimal Reward-Based Scheduling for Periodic Real-Time Tasks," IEEE Transactions on Computers, vol. 50, No. 2, Feb. 2001, pp. 111-130.

(Continued)

*Primary Examiner* — Van Nguyen
(74) *Attorney, Agent, or Firm* — Birch, Stewart, Kolasch & Birch, LLP

(57) ABSTRACT

A method for scheduling multiple periodic requests includes the following steps. The utilization rate of a processing unit is monitored. Multiple periodic requests are received, where the $i^{th}$ periodic request has an original period $P_i$ and an execution time $b_i$. The original period and the execution time of each periodic request are recorded. When the utilization rate of the processing unit exceeds an upper limit, the period of each periodic request is adjusted to be an updated period $P_i'$, $P_i'=n^{q_i}+\Delta$, n is an integer greater than 1, $q_i$ is an integer greater than 0, and $\Delta$ is an integer greater than or equal to 0. The periodic requests are scheduled according to the updated period of each periodic request and the execution time of each periodic request to obtain a scheduling result. The scheduling result is transmitted.

24 Claims, 6 Drawing Sheets

(56) References Cited

U.S. PATENT DOCUMENTS

| | | | | |
|---|---|---|---|---|
| 7,116,635 | B2* | 10/2006 | Nakano | G06F 9/4881 370/230 |
| 7,793,294 | B2 | 9/2010 | Haeri | |
| 8,205,205 | B2* | 6/2012 | Franke | G06F 9/5038 709/201 |
| 8,681,609 | B2 | 3/2014 | Szymanski | |
| 8,782,653 | B2* | 7/2014 | Gibson | G06F 1/3206 718/103 |
| 8,819,688 | B2 | 8/2014 | Camps Mur et al. | |
| 8,924,976 | B2* | 12/2014 | Park | G06F 9/4887 718/100 |
| 2002/0120488 | A1 | 8/2002 | Bril et al. | |
| 2008/0229318 | A1* | 9/2008 | Franke | G06F 9/5038 718/104 |
| 2011/0249578 | A1 | 10/2011 | Nayeb Nazar et al. | |
| 2013/0007415 | A1 | 1/2013 | Babayan et al. | |
| 2013/0055276 | A1* | 2/2013 | Park | G06F 9/4887 718/103 |
| 2014/0331234 | A1* | 11/2014 | Gibson | G06F 1/3206 718/103 |

FOREIGN PATENT DOCUMENTS

| | | |
|---|---|---|
| TW | 528951 B | 4/2003 |
| TW | 200935419 A | 8/2009 |
| TW | 201032135 A1 | 9/2010 |
| TW | 201136231 A1 | 10/2011 |

OTHER PUBLICATIONS

Han et al., "A Fault-Tolerant Scheduling Algorithm for Real-Time Periodic Tasks with Possible Software Faults," IEEE Transactions on Computers, vol. 52, No. 3, Mar. 2003, pp. 362-372.

Lu et al., "Efficient Data Retrieval Scheduling for Multi-Channel Wireless Data Broadcast," Proceedings IEEE INFOCOM, 2012, pp. 891-899.

OPC Foundation, "OPC Unified Architecture Specification Part 1: Overview and Concepts," Industry Standard Specification, Release 1.02, Jul. 10, 2012, pp. 1-20 (30 pages total).

Patil et al., "Adaptive General Perfectly Periodic Scheduling," pp. 1-6 (Published in Information Processing Letters, vol. 98, Issue 3, May 16, 2006, Published online Jan. 20, 2006).

Schroeder et al., "Web Servers Under Overload: How Scheduling Can Help," ACM Transactions on Internet Technology, vol. 6, No. 1, Feb. 2006, pp. 20-52.

Tseng et al., "The Design of a Distributed OMA-DM Services Portal Site Based on Virtual Machines," WHAMPOA—An Interdisciplinary Journal, vol. 64, 2013, pp. 157-170.

Weng, "The Study of Design and Performance Analysis of Presence and Instant Messaging System," Thesis submitted to National Chiao Tung University, Jul. 2005, pp. 1-45 (54 pages total), with an English abstract on p. 4.

* cited by examiner

METHOD FOR SCHEDULING MULTIPLE PERIODIC REQUESTS AND SCHEDULING DEVICE

CROSS-REFERENCE TO RELATED APPLICATION

This application claims the benefit of Taiwan application Serial No. 104139733, filed on Nov. 27, 2015, the subject matter of which is incorporated herein by reference.

TECHNICAL FIELD

The disclosure relates to a method for scheduling multiple periodic requests and a scheduling device.

BACKGROUND

With the concept of Industry 4.0 spreading, smart manufacturing is going to work in a brand new production process, in which a number of technologies are integrated, including cyber-physical systems, the Internet of Things, and the Internet of Services, to facilitate a new business model of "smart manufacturing and service". The key to an intelligent automation system is the capability of software/hardware system integration regarding various equipments and controllers, where response time of the equipment plays an important role. However, in an industrial transmission network, the hardware specification of the receiver is probably not good enough, so that the processor in the receiver may be unable to process multiple requests simultaneously. Thus, there is a need for a method for scheduling multiple requests efficiently.

SUMMARY

The disclosure relates to a method for scheduling multiple periodic requests and a scheduling device.

According to one embodiment, a method for request scheduling is provided. The method includes: monitoring a utilization rate of a processing unit; receiving multiple periodic requests, wherein each periodic request has a period and an execution time, the period of each periodic request is an original period value, the original period value of an $i^{th}$ periodic request is $P_i$ time unit(s), the execution time of the $i^{th}$ periodic request is $b_i$ time unit(s), $P_i$ and $b_i$ are positive integers; recording the original period value and the execution time of each periodic request; adjusting the period of each periodic request to an updated period value when the utilization rate of the processing unit is larger than an upper limit, wherein the updated period value of the $i^{th}$ periodic request is $P_i'$ time unit(s), $P_i' = n^{q_i} + \Delta$, n is a positive integer greater than 1, $q_i$ is a positive integer greater than 0, and $\Delta$ is an integer greater than or equal to 0; scheduling the periodic requests to obtain a scheduling result according to the updated period value of each periodic request and the execution time of each periodic request; and transmitting the scheduling result.

According to another embodiment, a scheduling device is provided. The scheduling device includes a processing unit, a communication unit, a memory unit, and a monitoring unit. The communication unit is configured to receive multiple periodic requests, wherein each periodic request has a period and an execution time, the period of each periodic request is an original period value, the original period value of an $i^{th}$ periodic request is $P_i$ time unit(s), the execution time of the $i^{th}$ periodic request is $b_i$ time unit(s), $P_i$ and $b_i$ are positive integers. The memory unit is configured to record the original period value and the execution time of each periodic request. The monitoring unit is configured to monitor a utilization rate of the processing unit. When the utilization rate of the processing unit is larger than an upper limit, the processing unit is configured to adjust the period of each periodic request to an updated period value, and schedule the periodic requests to obtain a scheduling result according to the updated period value of each periodic request and the execution time of each periodic request, the communication unit is configured to transmit the scheduling result. The updated period value of the $i^{th}$ periodic request is $P_i'$ time unit(s), $P_i' = n^{q_i} + \Delta$, n is a positive integer greater than 1, $q_i$ is a positive integer greater than 0, and $\Delta$ is an integer greater than or equal to 0.

Figure 1:
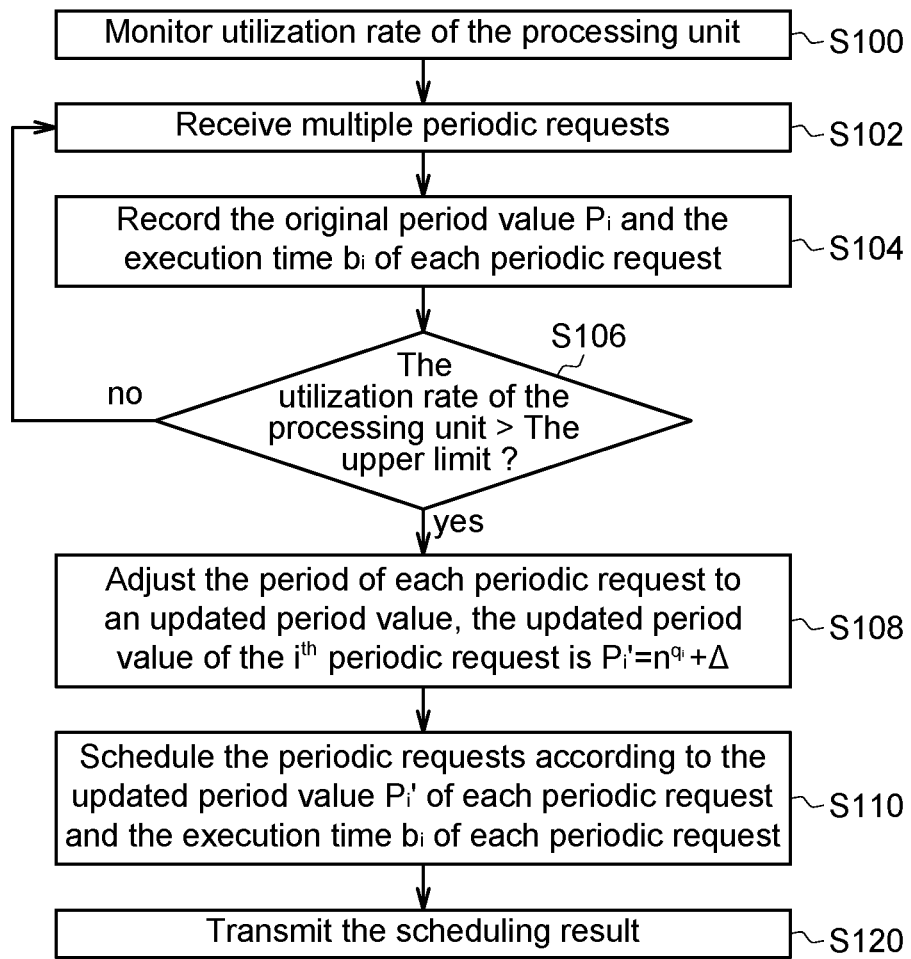
FIG. 1 shows a flowchart illustrating a method for request scheduling according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

With the trend of Industry 4.0 smart manufacturing, data collection has become important. Take a smart factory for example, when integrating a receiving device (such as a machine tool) into a smart manufacturing system, it is required to provide production parameters of a transmitting device (such as a backend management control system) to the receiving device. The receiving device executes manufacturing operations and receives information retrieval requests from the transmitting device. After setting up the receiving device, the hardware may be fixed and lack flexibility in further expansion. Therefore the central processing unit (CPU) of the receiving device may be overloaded due to unexpected or abnormal manufacturing events, resulting in excess response time and affecting the manufacturing process.

The events that increase the CPU loading may be two categories: (1) when the receiving device has a sudden large number of requests to be dealt with in an industrial transmission network. For example, when the receiving device is debugging or changing the access period, the CPU loading may suddenly boost when the receiving device processes such huge quantity of requests. (2) When the receiving device performs complicated operations, a large amount of CPU resources is required for the operations. If there are also periodic requests during that time, the CPU may be unable to process the network requests in time due to the high CPU loading. As such, network delay may be incurred such that the transmitting device fails to obtain parameter information, affecting the production flow.

A method for request scheduling is provided in the disclosure. The method proposed herein monitors the loading dynamically. For example, when the utilization rate of the CPU reaches a predetermined alert value, the periods of multiple requests are adjusted dynamically, such that the periodic requests can be processed efficiently. The CPU loading can be mitigated and the system can maintain acceptable response time and performance.

In one embodiment, Object Linking and Embedding (OLE) for Process Control—Unified Architecture (OPC UA) network transmission architecture is taken as an example. Peer to peer transmission method is used in the OPC UA transmission architecture. There may be multiple servers and multiple clients transmitting data in-between. The performance of the server may be affected by the number of connecting sessions and the number of request packets. The CPU of the server may be overloaded due to an increasing number of sessions and requests. According to one embodiment of the method for request scheduling in the disclosure, by monitoring the utilization rate of a processing unit in the receiving device(s) (such as the OPC UA server), the periods of the periodic requests from the transmitting device(s) (such as the OPC UA client) are adjusted dynamically to maintain the stability of the receiving device.

FIG. 1 shows a flowchart illustrating a method for request scheduling according to an embodiment of the disclosure. The method includes the following steps. Step S100: monitoring utilization rate U of a processing unit. Step S102: receiving multiple periodic requests. Step S104: recording the original period value $P_i$ and the execution time $b_i$ of each periodic request $Req_i$. Step S106: determining whether or not the utilization rate U of the processing unit is greater than an upper limit $TH_{up}$. Step S108: adjusting the period of each periodic request to an updated period value. The updated period value of the $i^{th}$ periodic request is $P_i'$ time unit(s), $P_i'=n^{1_i}+\Delta$. Step S110: scheduling the periodic requests to obtain a scheduling result according to the updated period value $P_i'$ of each periodic request and the execution time $b_i$ of each periodic request. Step S120: transmitting the scheduling result. The detailed description of each step is given below.

Step S100: monitoring utilization rate U of a processing unit. The processing unit may be a central processing unit, a microprocessor, or a microcontroller. In the previous example, the processing unit may be the CPU in the OPC UA server. The step S100 may be performed continually. For example, the utilization rate U of the processing unit may be monitored for every T seconds, T may be equal to 10 for example. That is, no matter what action is being performed by the receiving device, the current utilization rate U of the processing unit may be monitored continually. The utilization rate U may be referred to a percentage of resource in the processing unit being used. The utilization rate U may be related to the tasks currently being executed by the processing unit and the amount of loading. The range of the utilization rate U may be in 0%-100%.

Step S102: receiving k periodic requests $Req_1$, $Req_2$, . . . , $Req_k$. Each periodic request has a period and an execution time. The period of each periodic request is an original period value. The original period value of the $i^{th}$ periodic request $Req_i$ is $P_i$ time unit(s), and the execution time of the $i^{th}$ periodic request $Req_i$ is $b_i$ time unit(s) ($1 \le i \le k$). A time unit may be, for example, the execution time or the minimum execution time for a processing unit to process one request. The period and the execution time of each request may be normalized according to the length of the time unit. $P_i$ and $b_i$ are positive integers. The execution time $b_i$ represents the time that the processing unit has to spend on processing one request. The original period value $P_i$ represents how often the request occurs.

In one embodiment, in step S102, the periodic requests are received via a network transmission interface. For example, the OPC UA server receives multiple periodic requests from the OPC UA clients via Ethernet or wireless network interface (such as Wi-Fi). The disclosure is not limited thereto. The receiving device may also receive multiple periodic requests via other interface. For example, a processor may receive requests from the native machine via bus, or receive requests from a transmitting device via serial transmission interface.

Step S104: recording the original period value $P_i$ and the execution time $b_i$ of each periodic request $Req_i$. These values may be recorded in a table as shown in Table 1 below. Each row in the table corresponds to a periodic request $Req_i$. The table may be stored in the memory inside the OPC UA server.

TABLE 1

| i | Execution Time $b_i$ | Original Period Value $P_i$ |
|---|---|---|
| 1 | 1 | 8 |
| 2 | 1 | 4 |
| 3 | 2 | 7 |
| 4 | 4 | 13 |

Step S106: determining whether or not the utilization rate U of the processing unit is greater than an upper limit $TH_{up}$. The upper limit $TH_{up}$ may be an alert value. When the utilization rate U of the processing unit exceeds the alert value, the processing unit may become overloaded. Appropriate adjustment is required to reduce the loading of the processing unit to stabilize the processing unit. In one embodiment, the upper limit $TH_{up}$ may be set as 80%. If the determination result in the step S106 is no, the loading of the processing unit is still in an acceptable range, and hence the method goes back to the step S102. The steps S102, S104, and S106 are then repeated. If the determination result in the step S106 is yes (the utilization rate U of the processing unit is greater than the upper limit $TH_{up}$), step S108 is performed.

Step S108: adjusting the period of each periodic request to an updated period value. The updated period value of the $i^{th}$ periodic request $Req_i$ is $P_i'$ time unit(s), $P_i'=n^{q_i}+\Delta$. n is a positive integer greater than 1, $q_i$ is a positive integer greater than 0, and $\Delta$ is an integer greater than or equal to 0. In step S108, the period of each periodic request $Req_i$ is adjusted, such as being increased. Because the period is increased, the interval time between each occurrence of the periodic request $Req_i$ is increased as well. The distribution of multiple periodic requests in the time domain becomes sparse, effectively reducing the utilization rate U of the processing unit.

In one embodiment, n=2 and $\Delta$=0. The updated period value $P_i'$ is greater than or equal to the original period value $P_i$. For example, the updated period value $P_i'$ may be set as a power of 2 closest to the original period value $P_i$ but greater than or equal to the original period value $P_i$. If the original period value $P_i$ is 6, the updated period value $P_i'$ may be, for example, set as 8 ($2^3$=8). If the original period value $P_i$ is 11, the updated period value $P_i'$ may be, for example, set as 16 ($2^4$=16). In this embodiment, $q_i = \lceil \log_2 P_i \rceil$, where $\lceil\ \rceil$ is the ceiling function, such that the updated value $P_i'$ is greater than or equal to the original period value $P_i$. In this embodiment, n is 2. However, n may also be set as 3, 4, or other positive integers depending on the application. The greater the n value is, the larger the updated period value $P_i'$ would be. The interval time between the periodic requests becomes larger, which makes it more possible to reduce the utilization rate U of the processing unit. The greater the n value is, there would be more difference between the original period value $P_i$ and the updated period value $P_i'$, possibly resulting in a greater amount of period distortion in the updated period value $P_i'$.

In one embodiment, each periodic request $Req_i$ has a priority $W_i$. The priority $W_i$ may be a binary value 0 or 1, representing the importance of the periodic request $Req_i$ or whether the periodic request $Req_i$ should be processed first. For periodic request $Req_i$ having low priority (e.g., $W_i$=0), the period may be increased to a nearest power of n, as described in the above embodiment, $q_i = \lceil \log_n P_i \rceil$. On the other hand, for periodic request $Req_i$ having high priority (e.g., $W_i$=1), the period may be decreased to a nearest power of n. As such, the periodic request $Req_i$ may be processed more frequently. $q_i = \lfloor \log_n P_i \rfloor$ in this case, where $\lfloor\ \rfloor$ is the floor function, such that the updated value $P_i'$ is less than or equal to the original period value $P_i$.

Step S110: scheduling the periodic requests to obtain a scheduling result according to the updated period value $P_i'$ of each periodic request and the execution time $b_i$ of each periodic request. After adjusting the period of each periodic request $Req_i$ to be the updated period value $P_i'$, the schedule result may be obtained accordingly. The scheduling is based on the updated period value $P_i'$ and the execution time $b_i$. However, the scheduling algorithm adopted here is not limited to a particular algorithm. One possible implementation of the scheduling algorithm is given in the following description (referring to the embodiment shown in FIG. 3).

Step S120: transmitting the scheduling result. For example, after the receiving device obtains the scheduling result, the receiving device may transmit the scheduling result to the transmitting device. Each transmitting device is then able to transmit periodic request $Req_i$ to the receiving device according to the scheduling result. In one embodiment, the scheduling result is transmitted via a network transmission interface, such as being the same as the network transmission interface for receiving periodic requests.

Figure 2:
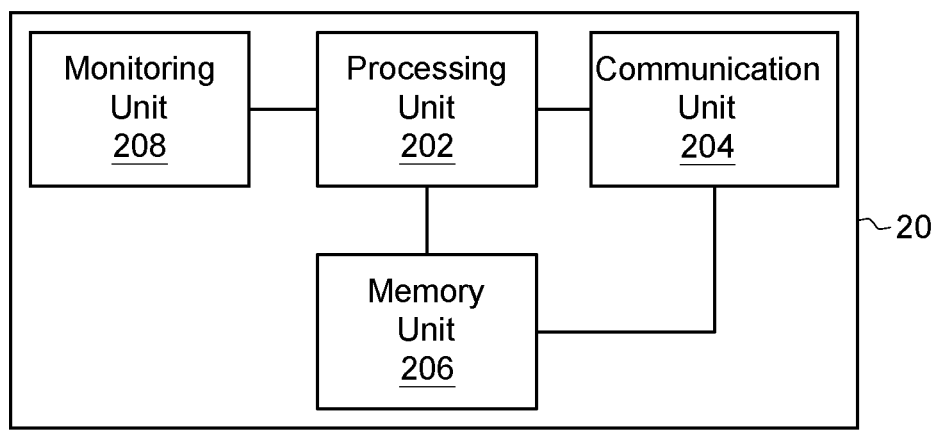
FIG. 2 shows a scheduling device according to an embodiment of the disclosure.

The method for request scheduling described above may be applied to a scheduling device. FIG. 2 shows a scheduling device according to an embodiment of the disclosure. The scheduling device 20 includes a processing unit 202, a communication unit 204, a memory unit 206, and a monitoring unit 208. The communication unit 204 is configured to receive multiple periodic requests, wherein each periodic request has a period and an execution time, the period of each periodic request is an original period value, the original period value of the $i^{th}$ periodic request $Req_i$ is $P_i$ time unit(s), the execution time of the $i^{th}$ periodic request $Req_i$ is $b_i$ time unit(s), $P_i$ and $b_i$ are positive integers (corresponding to the step S102). The memory unit 206 is configured to record the original period value $P_i$ and the execution time $b_i$ of each periodic request $Req_i$ (corresponding to the step S104). The monitoring unit 208 is configured to monitor utilization rate U of the processing unit 202 (corresponding to the step S100). When the utilization rate U of the processing unit 202 is larger than an upper limit $TH_{up}$, the processing unit 202 is configured to adjust the period of each periodic request to an updated period value $P_i'$ (corresponding to the steps S106 and S108), and schedule the periodic requests to obtain a scheduling result according to the updated period value $P_i'$ of each periodic request and the execution time $b_i$ of each periodic request $Req_i$ (corresponding to the step S110). The communication unit 204 is configured to transmit the scheduling result (corresponding to the step S120). The updated period value of the $i^{th}$ periodic request $Req_i$ is $P_i'$ time unit(s), $P_i' = n^{q_i} + \Delta$, n is a positive integer greater than 1, $q_i$ is a positive integer greater than 0, and $\Delta$ is an integer greater than or equal to 0.

The processing unit 202 may be a microprocessor. The method for request scheduling shown in FIG. 1 may be implemented by software, such as program codes stored in a computer readable medium. The processing unit 202 may load the program codes from the computer readable medium to execute the method for request scheduling shown in FIG. 1. In another embodiment, the processing unit 202 may be an application specific digital signal processor. In one embodiment, the method for request scheduling shown in FIG. 1 may be implemented by hardware circuits for better execution efficiency. The memory unit 206 may be random access memory (RAM) or flash memory for data storage. The monitoring unit 208 may be a software module executed by a processor or may be implemented by hardware circuit. The communication unit 204 is responsible for communicating with the transmitting device. In one embodiment, the communication unit 204 receives the periodic requests from the transmitting device via a network transmission interface (either wired or wireless network). In addition, the communication unit 204 may transmit the scheduling result to the transmitting device via the same network transmission interface. The communication unit 204 may be for example a network interface card.

According to the method for request scheduling and the scheduling device in the above embodiments, the periods of the periodic requests are adjusted to specific values when the utilization rate of the processing unit exceeds an upper limit, and scheduling is performed based on the adjusted periodic requests. The instantaneous loading of the processing unit can be reduced effectively. The response time and the performance of the system can thus be maintained in an acceptable range to sustain system stability. The functional balance between the receiving device, the transmitting device, and the standard communication interface can be achieved with reasonable hardware resource.

Figure 3:
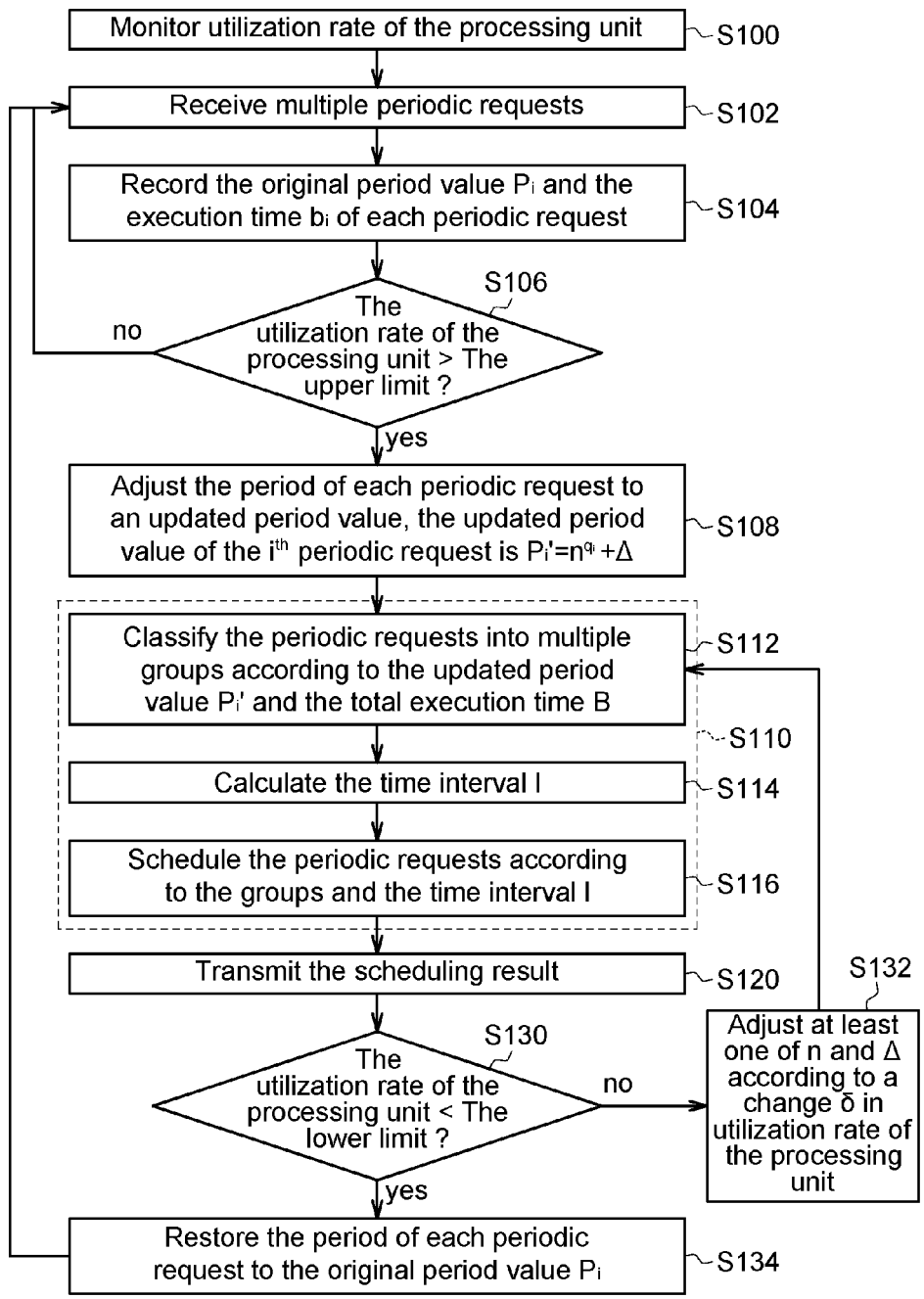
FIG. 3 shows a flowchart illustrating a method for request scheduling according to an embodiment of the disclosure.

FIG. 3 shows a flowchart illustrating a method for request scheduling according to an embodiment of the disclosure. The steps S100, S102, S104, S106, S108, S110, and S120 may be referred to in FIG. 1. In FIG. 3, the step S110 scheduling the periodic requests to obtain the scheduling result may comprise the following steps. Step S112: Classify the periodic requests into multiple groups according to the updated period value $P_i'$ and a total execution time B. Step S114: Calculate the time interval I. Step S116: Schedule the periodic requests according to the groups and the time interval I. The detailed description of each step is given below in accompany with reference to the example listed in Table 1.

In the example shown in Table 1, after the step S108 of adjusting the period (in this example, $P_i'=2^{q_i}$, and $q_i=\lceil\log_2 P_i\rceil$), the updated period value $P_i'$ may be obtained as shown in Table 2 below.

TABLE 2

| i | Execution Time $b_i$ | Original Period Value $P_i$ | Updated Period Value $P_i'$ |
|---|---|---|---|
| 1 | 1 | 8 | 8 |
| 2 | 1 | 4 | 4 |
| 3 | 2 | 7 | 8 |
| 4 | 4 | 13 | 16 |

Step S112 classifies the periodic requests into multiple groups according to the updated period value $P_i'$ and the total execution time B. First the total execution time B of all the periodic requests $Req_i$ is calculated:

$$B = \sum_{i=1}^{k} b_i.$$

In the example shown in Table 2, B=1+1+2+4=8. Each periodic request $Req_i$ is classified to a first group, a second group, a third group, and so on, depending on which range the updated period value $P_i'$ falls in. The ranges, for example, are (0, B], (B, 2B], (2B, 3B], and so on. The symbol (B, 2B] represents a numerical range greater than B, and less than or equal to 2B. Referring to the example in Table 2, the periodic requests $Req_1$, $Req_2$, $Req_3$ have the updated period value $P_i'$ less than or equal to 8. Hence these three requests belong to the first group. The periodic requests $Req_4$ has the updated period value $P_i'$ greater than 8 and less than or equal to 16, and hence belongs to the second group. Different groups correspond to different periods. Because the periods of the periodic requests in the first group are the smallest, the occurrence frequency of the periodic requests in the first group is the largest. One scheduling algorithm is to first schedule the periodic requests in the first group, and then schedule in sequential order the second group, the third group, and so on.

Step S114 then calculates the time interval I. In one embodiment, the groups after classification include a first group and at least one other group (for example, including a second group, a third group, and so on). The step S114 may include the following steps. First, calculate a sum of the execution time of every periodic request in the first group to be X time unit(s). Next, identify an indication periodic request having a largest execution time $b_i$ in each of the at least one other group. Calculate a sum of the execution time $b_i$ of the indication periodic request in every one of the at least one other group to be Y time unit(s). Calculate the time interval to be I time unit(s), I=X+Y.

The time interval I represents a time interval during which all the periodic requests in the first group and each indication periodic request in every one of the at least one other group may be put in. The concept may be expressed in a formula:

$$I = \sum_{i=1}^{m} G_{1,i} + \sum_{i=2}^{a} \max\{G_i\},$$

where m is the number of periodic requests in the first group, $G_{1,i}$ is the execution time of the $i^{th}$ periodic request in the first group, a is the total number of groups obtained in the step S112, and $\max\{G_i\}$ is the maximum execution time in the $i^{th}$ group. If the $i^{th}$ group is an empty set, that is, there is no periodic request in the $i^{th}$ group, $\max\{G_i\}$ is set to 0. Refer to the example shown in Table 2, the time interval I=(1+1+2)+4=8. Because all the periodic requests in the first group and the periodic request having the largest execution time in every one of the at least one other group can be put in the time interval I thus obtained, the time interval I may be used as a unit interval for scheduling. To schedule multiple periodic requests by repeating the time interval I, the processing unit is prevented from processing multiple requests at the same time, thereby reducing the utilization rate of the processing unit.

In one embodiment, if the updated period value $P_i'$ of the $i^{th}$ periodic request $Req_i$ is less than the time interval I, the updated period value $P_i'$ of the $i^{th}$ periodic request $Req_i$ is adjusted to be equal to the time interval I. Refer to the example shown in Table 2, the updated period value $P_2'$ of the $2^{nd}$ periodic request $Req_2$ is 4, which is less than the time interval 1=8. The updated period value $P_2'$ of the $2^{nd}$ periodic request $Req_2$ is adjusted to be equal to 8. After the adjustment, the $2^{nd}$ periodic request $Req_2$ occurs every 8 time units, making it possible to be scheduled with the repeated time interval I=8 as described above.

The step S116 schedules the periodic requests according to the groups obtained in the step S112 and the time interval I obtained in the step S114. As described above, by classifying into different groups according to the period in the step S112, and calculating the time interval I in the step S114, the scheduling result based on the time interval I makes the number of requests processed by the processing unit in each time unit less than or equal to 1. The processing unit is prevented from processing two or more requests simultaneously, thus reducing the utilization rate of the processing unit and providing better stability.

One possible implementation of the step S116 is described as follows. First, calculate the required number of time intervals V, $$V = \left\lceil \frac{\max\{P_i'\}}{I} \right\rceil,$$

where $\max\{P_i'\}$ represents the maximum value of the updated period value $P_i'$. Next, schedule the periodic requests according to the order of the groups. In each group, the periodic requests are sorted by the periods of the periodic requests in ascending order. For periodic requests having the same period in the same group, the periodic requests are sorted by execution time in descending order. In one embodiment, the arranging procedure mentioned above (arranging by period in ascending order, and arranging by execution time in descending order if the periods are equal) may be performed while executing the classification in the step S112. The scheduling in the step S116 may first schedule the first group, followed by scheduling the second group, the third group, and so on.

The steps S112, S114, and S116 may be performed by the processing unit 202 in the scheduling device 20 shown in FIG. 2. These steps classify the periodic requests after period adjustment, calculate the time interval, and schedule the periodic requests. The scheduling result thus obtained makes the number of requests processed by the processing unit in each time unit less than or equal to 1. Additional loading may be incurred regarding the steps S112, S114, and S116 performed by the processing unit 202. However, since multiple periodic requests which may request to process at the same time are separated in time domain, the processing unit is prevented from processing two or more requests at the same time, and the utilization rate U of the processing unit 202 can still be effectively reduced.

Refer to the method for request scheduling shown in FIG. 3, after performing the step S120 (transmitting the scheduling result), step S130 is executed: determining whether or not the utilization rate U of the processing unit is less than a lower limit $TH_{low}$. The lower limit $TH_{low}$ may represent a normal operation value of the processing unit. When the utilization rate U of the processing unit is less than a lower limit $TH_{low}$ (the determination result of the step S130 is yes), it may represent that the processing unit is now back to a normal operation state and there may be enough available resource in the processing unit. Then step S134 is executed: restoring the period of each periodic request $Req_i$ to the original period value $P_i$. The restored period is transmitted to the transmitting device such that the transmitting device may transmit the each periodic request $Req_i$ according to the original period value $P_i$. The step S134 may also include restoring the n and $\Delta$ to the initial values (for example, n=2 and $\Delta$=0). The lower limit $TH_{low}$, for example, may be 50%.

On the other hand, when the utilization rate U of the processing unit is not less than a lower limit $TH_{low}$ (the determination result of the step S130 is no), it may represent that the processing unit may still be overloaded. Further reduction on the loading may be attempted. Step S132 may be executed: adjusting at least one of n and $\Delta$ according to a change $\delta$ in the utilization rate of the processing unit. The change $\delta$ in the utilization rate may be the difference between the currently monitored utilization rate U and the previously monitored (e.g., T seconds before) utilization rate $U_{prev}$.

As described above, the updated period value $P_i$'=$n^{q_i}$+$\Delta$. In one embodiment, the initial value of n is 2, and the initial value of $\Delta$ is 0. The step S132 may include two phases: a fine tune phase for adjusting $\Delta$, and a coarse tune phase for adjusting n. For example, when performing the step S132, the $\Delta$ value may be first adjusted according to the formula: $\Delta=\lfloor A-B\times\delta^2 \rfloor$, where A and B are constants. For example, A=1.04, B=1. That is, when the change $\delta$ in the utilization rate between two monitored utilization rates of the processing unit is not large (if $\delta$ is small enough, $\delta$=1), maybe the current updated period value $P_i$' is not effective enough. Fine tune phase may be performed. In the fine tune phase, the updated period value $P_i$' is incremented by 1 to slightly increase the period. Then the scheduling procedures including steps S112, S114, and S116 are repeated. After scheduling, the step S130 is performed again to check whether or not the utilization rate U of the processing unit has reached the lower limit $TH_{low}$. If the utilization rate U still fails to drop below the lower limit $TH_{low}$, the step S132 may be performed again to calculate the $\Delta$ value to determine whether or not the updated period value $P_i$' is further incremented by 1. If the calculated $\Delta$ values in multiple consecutive runs of the step S132 (and the following steps S112, S114, S116, S120, and/or S130) are all equal to 1, it may represent that a larger scale period adjustment may be required. In this case, the n value may be adjusted to adjust the period in a larger scale. For example, if $\Delta$=1 in three consecutive runs of the step S132, the n value is incremented by 1, and the $\Delta$ value is reset to 0. The adjustment steps regarding n and $\Delta$ are not limited thereto. In one embodiment, the step S132 may adjust the n value only, or adjust the $\Delta$ value only, or adjust the $\Delta$ value and the n value in the fine tune phase and in the coarse tune phase respectively.

Refer to the embodiment shown in FIG. 3, the step S108 and the step S132 adjust the periods of multiple requests (RE-periodization). The step S112 classifies the periodic requests into different groups (Grouping). The step S114 calculates the time interval (Interval evaluation). The step S116 performs scheduling based on the time interval and the groups (Scheduling). The steps S108 (and/or S132), S112, S114, and S116 may be referred as the REGIS step in the following description. According to the method for request scheduling and the scheduling device in the above embodiments, when the monitored utilization rate of the processing unit falls in a specific range, the REGIS step is performed to dynamically adjust the periods of periodic requests and schedule them accordingly, thereby reducing the utilization rate of the processing unit.

Figure 4A:
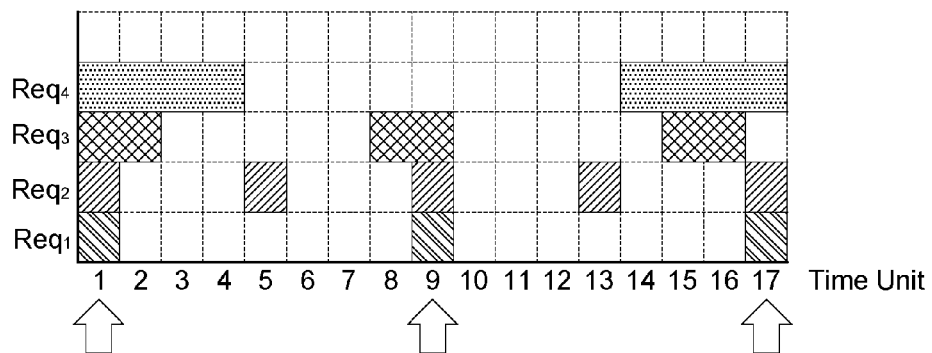
FIG. 4A shows a diagram illustrating the loading of the processing unit before applying the method for request scheduling according to an embodiment of the disclosure.

For a better understanding of the method for request scheduling, examples regarding application of the method for request scheduling are given below. FIG. 4A shows a diagram illustrating the loading of the processing unit before applying the method for request scheduling according to an embodiment of the disclosure. Parameters of each periodic request are shown in Table 1. The horizontal axis is time. The blocks stacked vertically are the scheduled time of $Req_1$, $Req_2$, $Req_3$, and $Req_4$ from bottom to top. As can be seen in FIG. 4A, before applying the REGIS step, the arrows in FIG. 4A point out the time units (time unit 1, 9, and 17) in which the processing unit needs to process three or more requests simultaneously, resulting in excess utilization rate.

Figure 4B:
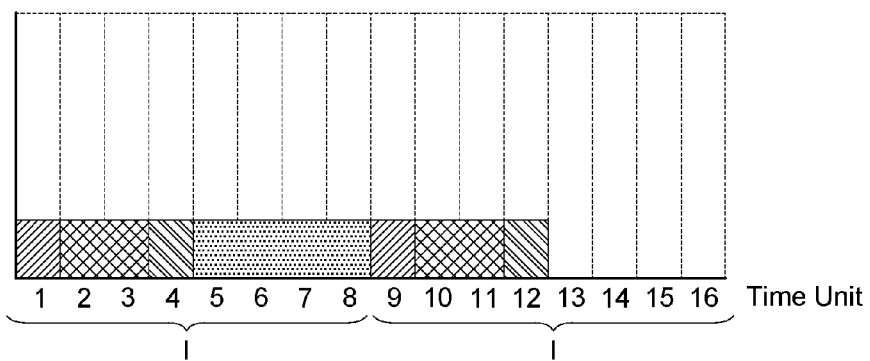
FIG. 4B shows a diagram illustrating the loading of the processing unit after applying the method for request scheduling according to an embodiment of the disclosure.

FIG. 4B shows a diagram illustrating the loading of the processing unit after applying the method for request scheduling according to an embodiment of the disclosure. The REGIS step includes: step S108 for adjusting the periods. The updated period value $P_i$' is shown in Table 2 (the calculation of the updated period value $P_i$' may be referred to the description related to Table 2 as mentioned above). Step S112 for classification. The first group includes $Req_1$, $Req_2$, and $Req_3$, and the $2^{nd}$ group includes $Req_4$. Step S114 for interval evaluation. The time interval I=(1+1+2)+4=8. The updated period value $P_2$' of the periodic request $Req_2$ is adjusted to be equal to 8 accordingly. Step S116 for scheduling. The time interval I=8. The required number of time intervals $$V = \frac{16}{8} = 2.$$

Therefore time units 1-8 are the first interval, and time units 9-16 are the second interval. The periodic requests $Req_1$-$Req_4$ are scheduled as shown in FIG. 4B. After the REGIS step, the number of requests processed by the processing unit in each time unit is less than or equal to 1.

Figure 4C:
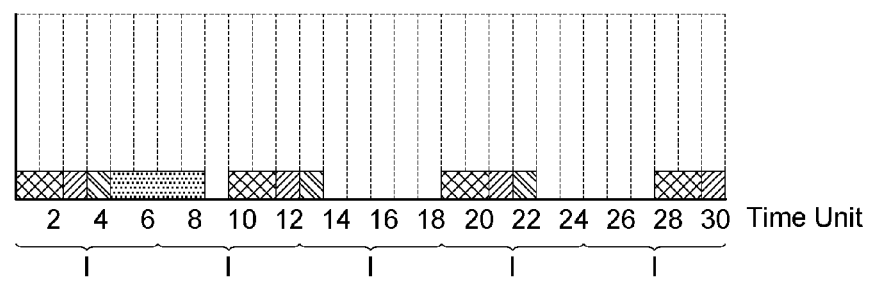
FIG. 4C shows a diagram illustrating the loading of the processing unit before applying the method for request scheduling according to an embodiment of the disclosure.

FIG. 4C shows a diagram illustrating the loading of the processing unit before applying the method for request scheduling according to an embodiment of the disclosure. In this example n=3 (as compared to the example shown in FIG. 4B where n=2). Step S108 for adjusting the periods.

The updated period value $P_i'$ is shown in Table 3 below (n=3).

TABLE 3

| i | Execution Time $b_i$ | Original Period Value $P_i$ | Updated Period Value $P_i'$ |
|---|---|---|---|
| 1 | 1 | 8 | 9 |
| 2 | 1 | 4 | 9 |
| 3 | 2 | 7 | 9 |
| 4 | 4 | 13 | 27 |

Step S112 for classification. The total execution time B=8. The first group ($P_i' \in (0,8]$) is an empty set. The $2^{nd}$ group ($P_i' \in (8,16]$) includes $Req_1$, $Req_2$, and $Req_3$. The $3^{rd}$ group ($P_i' \in (16,24]$) is an empty set. The $4^{th}$ group ($P_i' \in (24,32]$) includes $Req_4$. Step S114 for interval evaluation. The time interval I=0+2+4=6. Step S116 for scheduling with time interval I=6. The required number of time intervals $$V = \left\lceil \frac{27}{6} \right\rceil = 5.$$

The periodic requests $Req_1$-$Req_4$ are scheduled as shown in FIG. 4C. The number of requests processed by the processing unit in each time unit is less than or equal to 1. As compared to FIG. 4B, because n=3, the updated period value $P_i'$ is larger, the distribution of the periodic requests in the time domain becomes sparser, and the utilization rate U of the processing unit may be further reduced.

Figure 5A:
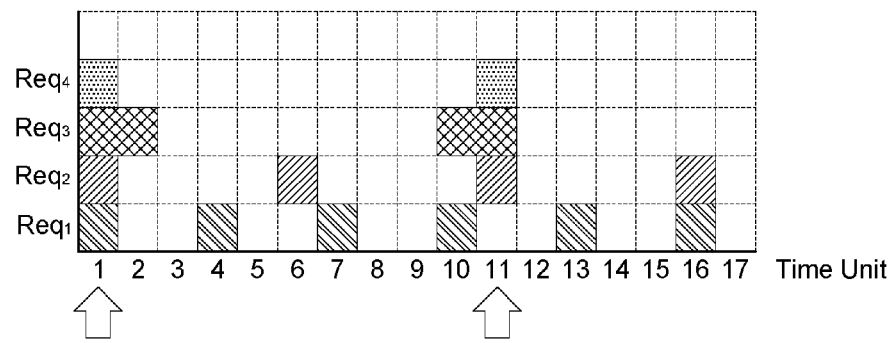
FIG. 5A shows a diagram illustrating the loading of the processing unit before applying the method for request scheduling according to an embodiment of the disclosure, wherein the periodic request has priority.

Another example is given below to show periodic requests having different priorities. FIG. 5A shows a diagram illustrating the loading of the processing unit before applying the method for request scheduling according to an embodiment of the disclosure, wherein the periodic request has priority. The priority $W_i=1$ represents the requests having high priority. On the other hand, the priority $W_i=0$ represents the requests having low or normal priority. The priority $W_i$ may be included in the request sent from the transmitting device. The priority $W_i$ of each periodic request $Req_i$ execution time $b_i$ of each periodic request $Req_i$, and the original period value $P_i$ of each periodic request $Req_i$, are shown in Table 4 below.

TABLE 4

| i | Priority $W_i$ | Execution time $b_i$ | Original period value $P_i$ | Updated Period Value $P_i'$ |
|---|---|---|---|---|
| 1 | 0 | 1 | 3 | 4 |
| 2 | 0 | 1 | 5 | 8 |
| 3 | 1 | 2 | 9 | 8 |
| 4 | 0 | 1 | 10 | 16 |

Figure 5B:
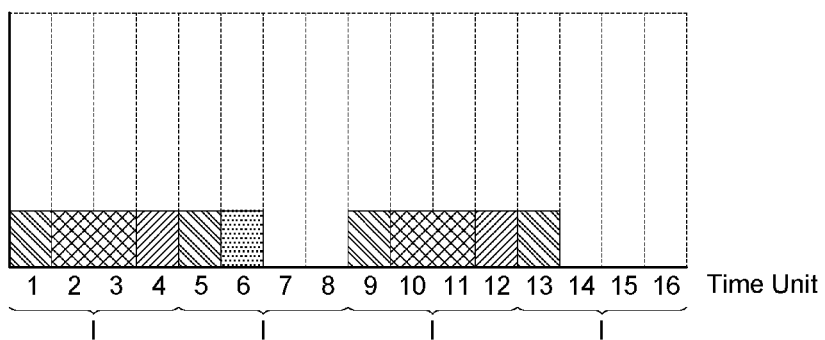
FIG. 5B shows a diagram illustrating the loading of the processing unit after applying the method for request scheduling according to an embodiment of the disclosure, wherein the periodic request has priority.

FIG. 5B shows a diagram illustrating the loading of the processing unit after applying the method for request scheduling according to an embodiment of the disclosure, wherein the periodic request has priority. The REGIS step includes: step S108 for period adjustment. In this example, n=2 and Δ=0. For periodic requests having priority $W_i=0$, the period is increased (or equal) to a nearest power of 2. For periodic requests having priority $W_i=1$, the period is decreased (or equal) to a nearest power of 2. The updated period values $P_i'$ of each periodic request $Req_i$ are shown in Table 4. Because $Req_3$ has high priority, the updated period value $P_3'$ is less than the original period value $P_3$. Step S112 for classification. The total execution time B=1+1+2+1=5. The first group ($P_i' \in (0,5]$) includes $Req_1$. The $2^{nd}$ group ($P_i' \in (6,10]$) includes $Req_2$ and $Req_3$. The $3^{rd}$ group ($P_i' \in (10,15]$) is an empty set. The $4^{th}$ group ($P_i' \in (15,20]$) includes $Req_4$. Step S114 for interval evaluation. The time interval I=1+2+1=4. Step S116 for scheduling with the time interval I=4. The required number of time intervals $$V = \frac{16}{4} = 4.$$

The periodic requests $Req_1$-$Req_4$ are scheduled as shown in FIG. 5B. After the REGIS step, the number of requests processed by the processing unit in each time unit is less than or equal to 1.

A simulation experiment is performed to verify the performance of the method proposed in the disclosure. The simulation environment is one OPC UA server connected to ten OPC UA clients. The monitoring time period for the processing unit in the OPC UA server is T=10 seconds. The execution time $b_i$ and the original period value $P_i$ of the periodic requests $Req_i$ are set to be random variables having Gaussian distribution with specific mean value and standard deviation. The priority $W_i$ of each periodic request $Req_i$ is set to 1 with 1% probability. The upper limit $TH_{up}$ in the step S106 is set to 80%. The lower limit $TH_{low}$ in the step S130 is set to 50%. The total number of requests sent from the ten OPC UA clients increases with time, remains a maximum number for a certain time period, and then gradually decreases. The period adjustment formula is $P_i = n^{q_i} + \Delta$. The initial value of n is 2, and the initial value of Δ is 0. In step S132, $\Delta = \lfloor A - B \times \delta^2 \rfloor$, A=1.04 and B=1.

Figure 6:
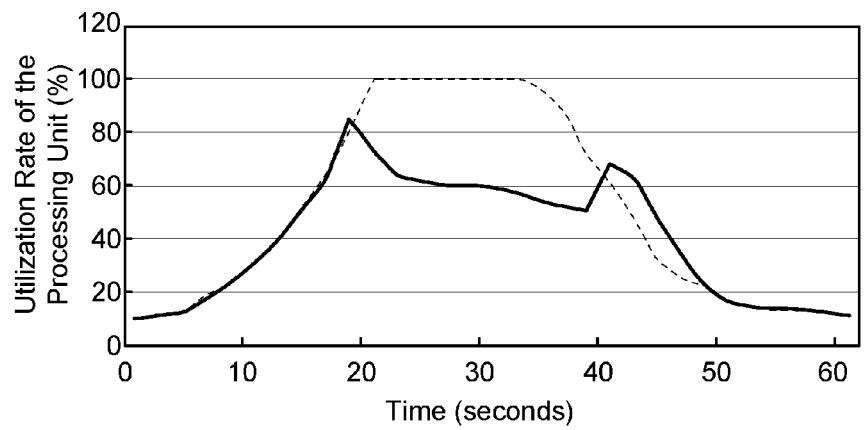
FIG. 6 shows a diagram illustrating difference between the utilization rate of the processing unit before and after applying the method for request scheduling according to an embodiment of the disclosure.

FIG. 6 shows a diagram illustrating difference between the utilization rate of the processing unit before and after applying the method for request scheduling according to an embodiment of the disclosure. A simulation is run according to the parameters set above. The dashed line in FIG. 6 represents the utilization rate of the processing unit without applying the REGIS step. During the time period 20 s-30 s, the utilization rate U of the processing unit is at full loading 100%. The solid line in FIG. 6 shows the utilization rate of the processing unit with the REGIS step applied. When the utilization rate U reaches 80%, step S108 is executed to adjust periods and step S110 is executed to schedule according to the updated period values. Because the REGIS step takes a certain amount of resource of the processing unit, the utilization rate U increases slightly (increases about 5% when performing the REGIS step). However, after the REGIS step, the utilization rate U of the processing unit drops rapidly.

When the utilization rate U of the processing unit decreases to 50%, the REGIS step is disabled. The period of each periodic request $Req_i$ is restored to the original period value $P_i$. The utilization increases about 7% abruptly, but then decreases to the level same as that without applying the REGIS step. According to the simulation result shown in FIG. 6, by adopting the method for request scheduling in the disclosure, the utilization rate U of the processing unit in the OPC UA server decreases about 20% as compared to that without the REGIS step.

Figure 7:
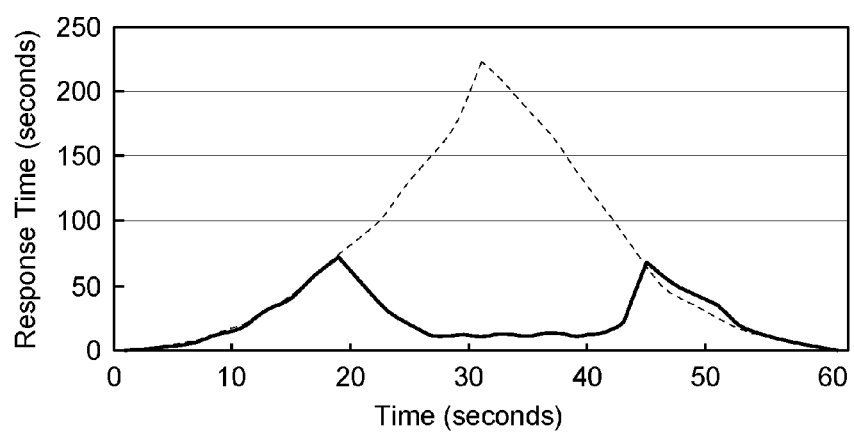
FIG. 7 shows a diagram illustrating difference between the response time of the processing unit before and after applying the method for request scheduling according to an embodiment of the disclosure.

FIG. 7 shows a diagram illustrating difference between the response time of the processing unit before and after applying the method for request scheduling according to an embodiment of the disclosure. The simulation environment is the same as that in FIG. 6. The dashed line in FIG. 7 corresponds to the REGIS step not applied (referred as method one), while the solid line correspond to the REGIS step not applied (referred as method two). When the utilization rate U of the processing unit reaches 80%, the REGIS step is enabled. The response time drops rapidly (16 times performance enhancement as compared to the maximum response time in the method one) and remains for a period of time (14 seconds, about 23% of the test period). When the utilization rate U of the processing unit decreases to 50%, the REGIS step is disabled. The period of each periodic request $Req_i$ is restored to the original period value $P_i$. The response time increases abruptly (1.08 times response time increase as compared to the method one), but then (after 10 seconds) decreases to a level same as that in the method one. According to the simulation result shown in FIG. 7, by adopting the method two, the response time of the processing unit in the OPC UA server can be reduced effectively. The performance of the processing unit is increased about 69% as compared to the method one.

According to the method for request scheduling and the scheduling device in the above embodiments, no matter whether or not the periodic requests have priority, the periods of the periodic requests can be dynamically adjusted when then utilization rate of the processing unit is too high. The loading of the processing unit can thus be reduced to keep the system operating in an acceptable response time and performance. By applying the method for request scheduling and the scheduling device in the disclosure, when the processor of a receiving device in an industry network transmission system is overloaded, the packet rate can be reduced to mitigate the processor loading and enhance the efficiency of the entire industrial network transmission system, thereby improving the competitiveness of the system and facilitating developments of related industries.

The method for request scheduling and the scheduling device in the disclosure can be applied to a high efficiency industrial network transmission system with high loading, and can be implemented according to the OPC UA standards, thus compatible to the OPC UA server (may be regarded as a receiving device) and the OPC UA client (may be regarded as a transmitting device). By dynamically adjusting the periods of the periodic requests sent from the transmitting device, the balance of the utilization rate between three major tasks of the receiving device can be achieved: (a) execution of manufacturing operation, (b) retrieval of equipment information, and (c) periodic packet of information report. In addition, the receiving device can be maintained to operate stably and reliably with reasonable hardware resource.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for request scheduling, comprising:
   monitoring a utilization rate of a processing unit;
   receiving a plurality of periodic requests, wherein each periodic request has a period and an execution time, the period of each periodic request is an original period value, the original period value of an $i^{th}$ periodic request is $P_i$ time unit(s), the execution time of the $i^{th}$ periodic request is $b_i$ time unit(s), $P_i$ and $b_i$ are positive integers, and the period of each periodic request represents how often each periodic request occurs;
   recording the original period value and the execution time of each periodic request;
   adjusting the period of each periodic request to an updated period value when the utilization rate of the processing unit is larger than an upper limit, wherein the updated period value of the $i^{th}$ periodic request is $P_i'$ time unit(s), $P_i' = n^{q_i} + \Delta$, n is a positive integer greater than 1, $q_i$ is a positive integer greater than 0, and $\Delta$ is an integer greater than or equal to 0;
   scheduling the plurality of periodic requests to obtain a scheduling result according to the updated period value of each periodic request and the execution time of each periodic request; and
   transmitting the scheduling result.

2. The method according to claim 1, wherein n=2, $\Delta$=0, and the updated period value is greater than or equal to the original period value.

3. The method according to claim 1, wherein each periodic request has a priority, if the priority of the $i^{th}$ periodic request is high, $q_i = \lfloor \log_n P_i \rfloor$, and if the priority of the $i^{th}$ periodic request is low, $q_i = \lceil \log_n P_i \rceil$.

4. The method according to claim 1, wherein the scheduling the plurality of periodic requests to obtain the scheduling result comprises:
   calculating a total execution time, and classifying the plurality of periodic requests into a plurality of groups according to the updated period value and the total execution time, wherein the total execution time is a sum of the execution time of every periodic request of the plurality of periodic requests.

5. The method according to claim 4, wherein the plurality of groups comprise a first group and at least one other group, the scheduling the plurality of periodic requests to obtain the scheduling result further comprises:
   calculating a sum of the execution time of every periodic request in the first group to be X time unit(s);
   identifying an indication periodic request having a largest execution time in each of the at least one other group;
   calculating a sum of the execution time of the indication periodic request in every one of the at least one other group to be Y time unit(s); and
   calculating a time interval to be I time unit(s), I=X+Y.

6. The method according to claim 5, wherein the scheduling the plurality of periodic requests to obtain the scheduling result further comprises:
   adjusting the updated period value of the $i^{th}$ periodic request to be equal to the time interval if the updated period value of the $i^{th}$ periodic request is less than the time interval.

7. The method according to claim 5, wherein the scheduling the plurality of periodic requests to obtain the scheduling result further comprises:
   scheduling the plurality of periodic requests according to the groups and the time interval to obtain the scheduling result;
   wherein a number of the plurality of periodic requests processed by the processing unit in each time unit is less than or equal to 1 in the scheduling result.

8. The method according to claim 7, wherein the scheduling the plurality of periodic requests to obtain the scheduling result further comprises:
   scheduling the plurality of periodic requests according to an order of the plurality of groups, wherein the plurality of periodic requests are sorted by the periods of the plurality of periodic requests in ascending order in each group, and periodic requests having a same period are sorted by the execution time in descending order in a same group.

9. The method according to claim 1, further comprising:
adjusting at least one of n and A according to a change δ in the utilization rate of the processing unit when the utilization rate of the processing unit is not less than a lower limit.

10. The method according to claim 9, wherein $\Delta = \lfloor A - B \times \delta^2 \rfloor$, A and B are constants.

11. The method according to claim 1, further comprising:
restoring the period of each periodic request to the original period value when the utilization rate of the processing unit is less than a lower limit.

12. The method according to claim 1, wherein the receiving the plurality of periodic requests is via a network transmission interface, and the transmitting the scheduling result is via the network transmission interface.

13. A scheduling device, comprising:
a processing circuit;
a communication circuit, receiving a plurality of periodic requests, wherein each periodic request has a period and an execution time, the period of each periodic request is an original period value, the original period value of an $i^{th}$ periodic request is $P_i$ time unit(s), the execution time of the $i^{th}$ periodic request is $b_i$ time unit(s), $P_i$ and $b_i$ are positive integers, and the period of each periodic request represents how often each periodic request occurs;
a memory circuit, recording the original period value and the execution time of each periodic request; and
a monitoring circuit, monitoring a utilization rate of the processing circuit;
wherein when the utilization rate of the processing circuit is larger than an upper limit, the processing circuit is configured to adjust the period of each periodic request to an updated period value, and schedule the plurality of periodic requests to obtain a scheduling result according to the updated period value of each periodic request and the execution time of each periodic request, the communication circuit is configured to transmit the scheduling result;
wherein the updated period value of the $i^{th}$ periodic request is $P_i'$ time unit(s), $P_i' = n^{q_i} + \Delta$, n is a positive integer greater than 1, $q_i$ is a positive integer greater than 0, and A is an integer greater than or equal to 0.

14. The scheduling device according to claim 13, wherein n=2, Δ=0, and the updated period value is greater than or equal to the original period value.

15. The scheduling device according to claim 13, wherein each periodic request has a priority, if the priority of the $i^{th}$ periodic request is high, $q_i = \lfloor \log_n P_i \rfloor$, and if the priority of the $i^{th}$ periodic request is low, $q_i = \lceil \log_n P_i \rceil$.

16. The scheduling device according to claim 13, wherein the processing circuit is further configured to calculate a total execution time, and classify the plurality of periodic requests into a plurality of groups according to the updated period value and the total execution time, wherein the total execution time is a sum of the execution time of every periodic request of the plurality of periodic requests.

17. The scheduling device according to claim 16, wherein the plurality of groups comprise a first group and at least one other group, the processing circuit is further configured to:
calculate a sum of the execution time of every periodic request in the first group to be X time unit(s);
identify an indication periodic request having a largest execution time in each of the at least one other group;
calculate a sum of the execution time of the indication periodic request in every one of the at least one other group to be Y time unit(s); and
calculate a time interval to be I time unit(s), I=X+Y.

18. The scheduling device according to claim 17, wherein the processing circuit is further configured to adjust the updated period value of the $i^{th}$ periodic request to be equal to the time interval if the updated period value of the $i^{th}$ periodic request is less than the time interval.

19. The scheduling device according to claim 17, wherein the processing circuit is configured to schedule the plurality of periodic requests according to the groups and the time interval to obtain the scheduling result, wherein a number of the plurality of periodic requests processed by the processing circuit in each time unit is less than or equal to 1 in the scheduling result.

20. The scheduling device according to claim 19, wherein the processing circuit is further configured to schedule the plurality of periodic requests according to an order of the plurality of groups, wherein the plurality of periodic requests are sorted by the period of periodic requests in ascending order in each group, and periodic requests having a same period are sorted by the execution time in descending order in a same group.

21. The scheduling device according to claim 13, wherein the processing circuit is further configured to adjust at least one of n and Δ according to a change δ in utilization rate of the processing circuit when the utilization rate of the processing circuit is not less than a lower limit.

22. The scheduling device according to claim 21, wherein $\Delta = \lfloor A - B \times \delta^2 \rfloor$, A and B are constants.

23. The scheduling device according to claim 13, wherein the processing circuit is further configured to restore the period of each periodic request to the original period value when the utilization rate of the processing circuit is less than a lower limit.

24. The scheduling device according to claim 13, wherein the communication circuit receives the plurality of periodic requests via a network transmission interface, and the communication circuit transmits the scheduling result via the network transmission interface.

* * * * *